3,050,566
3-(2,2,3-TRIMETHYLCYCLOBUTYL)-BUT-1-YN-3-OL
AND PROCESS FOR PREPARING SAME
Habib-Emile Eschinazi, Montclair, N.J., now by change of name Emile Haviv Eschinasi, assignor to The Givaudan Corporation, New York, N.Y., a corporation of New Jersey
No Drawing. Filed Apr. 2, 1959, Ser. No. 803,565
1 Claim. (Cl. 260—617)

This invention relates to the novel chemical, 3-(2,2,3-trimethylcyclobutyl)-but-1-yn-3-ol, and to a process for preparing it.

The novel material of this invention is useful as a perfume agent, having the rosy note reminiscent of linalool from bois de rose oil, and is also useful as an intermediate in the synthesis of organic chemicals, such as isomers of methyl citrals used in the perfume and pharmaceutical industries. In particular, the novel chemical of this invention may be used in the synthesis of irones, in accordance with the following reaction sequence set forth in accepted abbreviated form:

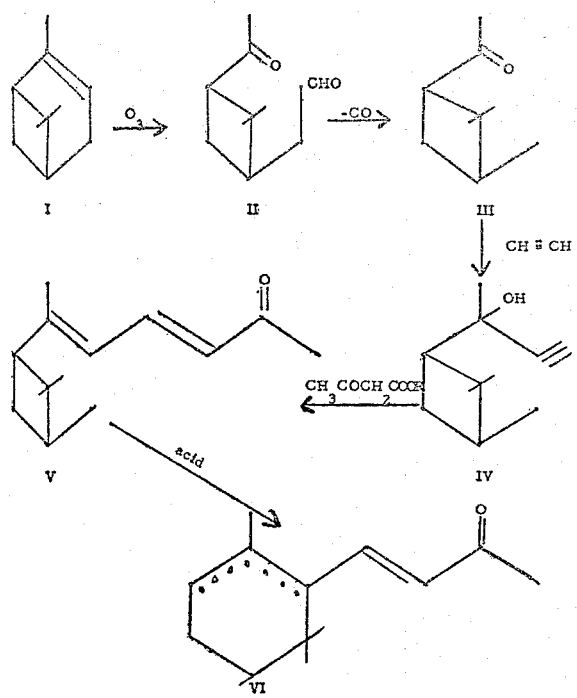

The names of the compounds represented by the Roman numerals in the foregoing sequence are as follows:

I. α-Pinene
II. Pinonic aldehyde
III. 1-acetyl-2,2,3-trimethylcyclobutane
IV. 3-(2,2,3-trimethylcyclobutyl)-but-1-yn-3-ol
V. 2-(2,2,3-trimethylcyclobutyl)-hepta-2,4-dien-6-one
VI. Irone Novel processes and/or novel products involved in the preparation of II, III, V and VI are disclosed and claimed in the following applications filed of even date herewith by the present applicant: Ser. No. 803,593; Ser. No. 803,594; Ser. No. 803,595; and Ser. No. 803,596; respectively.

The novel chemical of this invention is prepared by reacting 1-acetyl-2,2,3-trimethylcyclobutane (sometimes herein-referred to as pinonone) with an acetylene compound in the presence of a basic catalyst at low temperatures. The reaction is conducted by bubbling acetylene through a suspension of the catalyst in a suitable solvent while simultaneously adding pinonone and continuing the reaction until the absorption of acetylene ceases.

Basic catalysts which are useful in accordance with this invention include sodium hydroxide, potassium hydroxide, metallic sodium, sodamide, lithium amide, potassium amide, and alkali metal acetylides.

If desired, solvents may be used in the process of this invention. Solvents which may be used include acetals, e.g., methylal, butyraldehyde dimethyl acetal; also ethers, such as diethyl ether; or aromatic hydrocarbons, such as toluene.

The proportions of the reactants and catalysts which may be used may vary within limits. For each mol of pinonone, from about 1 to about 5 mols of acetylene and from about 1 to about 5 mols of catalyst may be used. Advantageous results are obtained when about 1 to about 2 mols of acetylene and about 1 to about 4 mols of catalyst, per mol of pinonone, are employed. The higher amounts of catalyst are used when potassium hydroxide or sodium hydroxide is used as the catalyst.

The temperature at which the process of this invention is conducted may also vary over a wide range. Temperatures from about −50° C. to about 0° C. are satisfactory, temperatures from about −30° C. to about −10° C. being especially desirable.

In order to illustrate this invention the following examples are given, but not by way of limitation.

EXAMPLE I (a) Preparation of 2,2-Dimethyl-3-Acetylcyclobutylacetaldehyde 136 g. of α-pinene, 120 ml. methanol and 60 ml. of water were placed in a 500 ml. reaction vessel cooled from the outside with an ice-water bath, while a stream of ozonized oxygen, from a commercial "Welsbach" T23 ozonator and containing approximately 70–75 mg. ozone per liter, was fed at the rate of 100 liters/hour through a glass, porous pipe dipped into the mixture. After about 7 hrs., the ozone started bleeding out with the out-going gases and the ozonization was stopped. The reaction mixture was then transferred into a 2-liter flask equipped with a stirrer, a reflux condenser and a dropping funnel and containing 500 ml. water, 50 ml. benzene and 65 g. zinc dust. Then 160 g. 62% sulfuric acid was added under agitation within 5–10 minutes. The reaction mixture started to boil vigorously and was kept under agitation for 10 more minutes. After cooling, the layers are separated and the bottom layer extracted twice with 100 ml. benzene. The combined organic layers are now neutralized with soda ash and the solvent evaporated, leaving behind 140 g. of crude pinonic aldehyde showing a purity of approximately 90% by oximation.

Upon distillation in a 1½-ft. column, approximately 10% of a light cut is obtained followed by about 113 g. of pure pinonic aldehyde boiling at 93° at 3 mm., $n_D^{20}$ 1.4610, $\alpha_D$ 40° showing 98.5% purity by oximation.

(b) Preparation of 1-Acetyl-2,2,3-Trimethylcyclobutane

Into a 3-necked flask provided with a stirrer, a thermometer, a dropping funnel and a short column with a reflux condenser, 35–40 ml. of pinonic aldehyde is introduced; then 0.5 g. of a 5% palladium on charcoal catalyst is added and the mixture heated under stirring to 200–230°. Carbon monoxide starts to be evolved and is measured by passing the liberated gases through a wet-test meter and then discharged into a very efficient hood (toxic CO). As soon as the gas evolution reaches about 2 liters, additional pinonic aldehyde is slowly introduced through the dropping funnel, while the light distillate of pinonone (below 150°) is collected.

The rate of addition of pinonic aldehyde is so adjusted, that it is approximately equal to the amount of distilled pinonone. The reaction temperature is maintained around 210–220°. 400 g. of pinonic aldehyde is thus introduced within 6–7 hrs., while 55 liters of CO are measured. The total amount of distillate reaches 305 g. and a slight vacuum applied towards the end results in an additional 5–10 g. distillate. The residue consists of about 30 g. of dark, heavy liquid from which the catalyst may be recovered.

The pure pinonone boils at 55–57° at 10 mm. pressure, $n_D^{20}$ 1.4400–1.4410. It consists of a mixture of cis and trans isomers. A semicarbazone M.P. 197–8 and a 2.4 dinitrophenyl hydrazone M.P. 201–202° were obtained from the distilled pinonone.

(c) Preparation of 3-(2,2,3-Trimethylcyclobutyl)-But-1-Yn-3-Ol

In a dry one-liter 3-necked flask are added 280 g. methylal and 224 g. powdered KOH. The flask is provided with a gas inlet tube, an efficient stirrer, a dropping funnel and a gas outlet. The mixture is agitated and cooled to −10° while a dry stream of acetylene is bubbled through. For the first 20–30 minutes, the acetylene is practically all absorbed in the reaction mixture as evidenced by the very small amount of gas bleeding from the gas outlet. As soon as the gas discharge increases, 140 g. of pinonone is slowly introduced around −10 to −5° while the acetylene is being continuously fed. The addition of the ketone is made within about 4 hrs. The mixture is agitated for an additional 2 hrs. and the bubbling of acetylene is continued at such a rate that a small bleeding of the gas takes place continuously, while the temperature is maintained at −5° or slightly below. 500 ml. of ice water are now introduced very slowly under cooling and strong agitation, so that the temperature does not rise above +30°. The top layer is separated and the aqueous layer extracted with benzene. The combined organic layers are freed from the solvents and the 3-(2,2,3-trimethylcyclobutyl)-but-1-yn-3-ol is obtained as a mixture of cis-trans isomers boiling at 70–74° at 8 mm., $n_D^{20}$ 1.4622–1.4670, $\alpha_D$ −3 in a yield of approximately 90% based on the reacted pinonone.

*Analysis.*—Calc'd for $C_{11}H_{18}O$: C, 79.46; H, 10.91. Found: C, 79.76; H, 11.02.

EXAMPLE II

Into a 800 ml. Dewar flask, containing 400 ml. liquid ammonia, a good stream of dry acetylene is introduced for 10 minutes under agitation; then 24 g. of metallic sodium are added in small pieces within 20–40 minutes while acetylene is being continuously fed. When all the sodium has reacted as shown by the discharge of the blue color from the mixture, 140 g. pinonone in 70 ml. toluene is added within 5–10 minutes while a slight stream of acetylene is maintained for 5–6 hrs. Then the excess of ammonia is left to evaporate until the contents rose in temperature to 0° C. At this point, 50 ml. toluene and 250 ml. water are added and the reaction mixture stirred for 5 minutes. The top organic layer is separated and the aqueous layer extracted with toluene. The combined toluene extracts are free from the solvent by evaporation and the 3-(2,2,3-trimethylcyclobutyl)-but-1-yn-3-ol, approximately 140 g. are distilled at 10 mm. at 79–81°, $n_D^{20}$ 1.4640–1.4665, $\alpha_D$ −4°.

The foregoing illustrates the practice of this invention, which, however, is not to be limited thereby, but is to be construed as broadly as permissible in view of the prior art and limited solely by the appended claim.

I claim:
The chemical product, 3-(2,2,3-trimethylcyclobutyl)-but-1-yn-3-ol.

References Cited in the file of this patent
UNITED STATES PATENTS 2,779,799    Hamlin _____ Jan. 29, 1957

FOREIGN PATENTS 544,221    Great Britain _____ Apr. 2, 1942

OTHER REFERENCES

Schmidt et al.: Jour. Amer. Chem. Soc., vol. 76 (1954), pages 5426–30 (5 pages).

Papa et al.: Jour. Amer. Chem. Soc., vol. 76 (1954), pages 4446–50 (5 pages).